R. KING.
CLASP.
APPLICATION FILED DEC. 9, 1920.
1,371,210.
Patented Mar. 8, 1921.
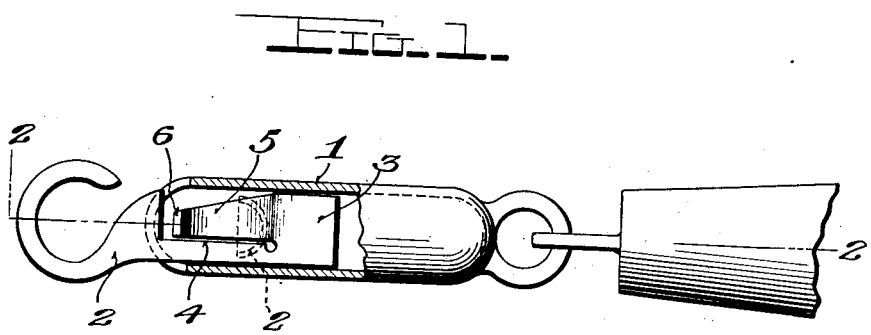
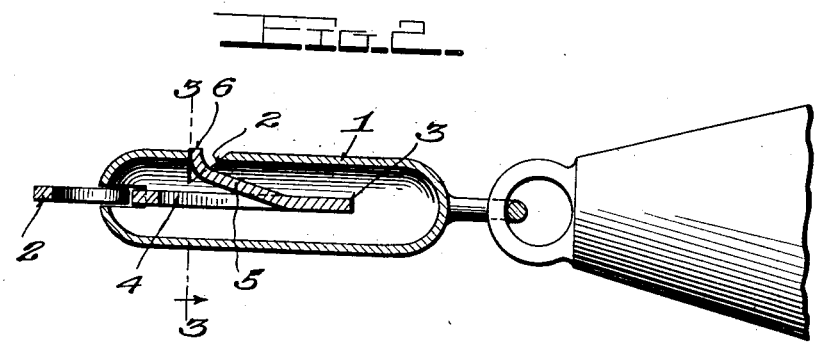
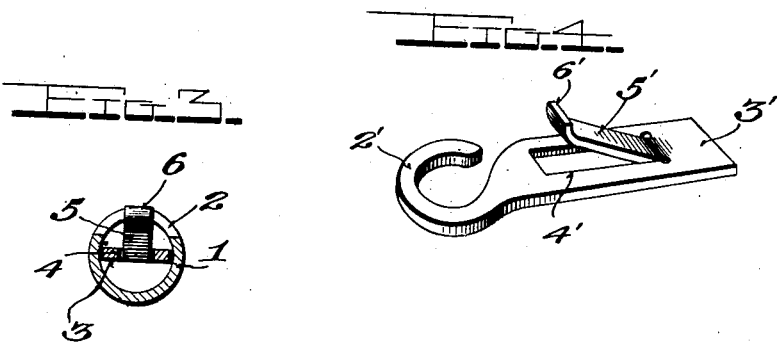
INVENTOR.
Rufus King
BY
Joseph A. Miller
ATTORNEY.

UNITED STATES PATENT OFFICE.

RUFUS KING, OF PLAINVILLE, MASSACHUSETTS, ASSIGNOR TO BUGBEE & NILES COMPANY, OF NORTH ATTLEBORO, MASSACHUSETTS.

CLASP.

1,371,210. Specification of Letters Patent. Patented Mar. 8, 1921.

Application filed December 9, 1920. Serial No. 429,400.

*To all whom it may concern:*

Be it known that I, RUFUS KING, a citizen of the United States, residing at Plainville, in the county of Norfolk and State of Massachusetts, have invented new and useful Improvements in Clasps, of which the following is a specification.

This invention relates to certain new and useful improvements in snap clasps, and the primary object thereof is to provide a clasp which has improved locking or latching means for the hook thereof.

A further object of the invention is to provide a clasp in which the latching means is of simple and economical construction and which may be made integral with the shank of the hook.

A still further object of the invention is to provide locking means which is positive in the performance of its function, so as to hold the hook against any possible accidental movement.

In the drawings:

Figure 1 is a side elevation partly broken away and in section of the invention;

Fig. 2 is a section on line 2—2 of Fig. 1;

Fig. 3 is a section on line 3—3 of Fig. 2; and

Fig. 4 is a detail perspective view of a modified form of the invention.

In proceeding in accordance with the present invention, the casing 1 may be of any desired form, as to shape or material but is formed with a preferably segmental shaped opening 2 in a side thereof, as depicted in Fig. 1 of the drawings. The hook member $2^a$ has a shank 3 which slides within the casing and through one of the end walls of the latter, as usual. The shank 3, in the form of the invention shown in Fig. 1, is provided with an L-shaped cut 4, with the shorter part of the L extending through one of the side edges of the shank 3 as shown. The material within the confines of the cut is then deflected at an angle at 5 to form an arm and the end thereof is turned at approximately right-angles at 6 to form a latch, which latter is adapted to project through the cut-out or notch 2 when the hook is in locked position as shown in Fig. 2 of the drawings. It will be understood that the shank 3 has spring properties so that the end 6 forming the latch proper will snap into the opening 2. The opening 2 it will be seen, forms a finger-nail guide so that the user can engage the finger-nail with the end of latch 6 and by depressing the latter the hook $2^a$ may be moved to unlocked position. When the hook is moved to locked position, it will be seen that the latch 6 will snap into the opening or cut-out 2 and thus automatically effect locking or latching of the hook.

In the form of the invention depicted in Fig. 4, instead of the arm 5 being formed by an L-shaped cut, and located at one side of the shank, the same is formed by a central U-shaped cut 4' to form the arm 5', the latter provided with the end 6' constituting the latch. In this form of the invention it will be seen that the arm 5' is disposed centrally between the side edges of the shank 3'. This form of the invention operates identically the same as in the preferred form.

It will be seen that in both forms of the invention accidental movement of the latch to a position allowing the unlocking of the hook is virtually impossible, since the latch 6 or 6' in each instance lies approximately flush with the periphery of the casing. It will further be seen that the latch 6 during the opening movement of the hook engages the front end wall of the casing and acts to limit the outward movement of the hook so that the latter cannot be completely withdrawn from the casing.

What is claimed is:

1. In a clasp, a casing, a hook having its mouth closed by the casing in one position of the hook and having a shank slidable in the casing, said casing having an opening in a side thereof, and an arm integral with the shank and extending at an angle thereto and having a substantially right angular end forming a latch receivable in the opening, said latch being formed to engage the end wall of the casing through which the hook slides to limit the opening movement of the hook and to prevent separation of the hook from the casing.

2. In a clasp, a casing, a hook slidable through an end of the casing, and having its mouth closed by the casing in one position of the hook the casing having an opening to one side of the hook, and a latch borne by the hook and engageable through the opening to lock the hook in closed position and being engageable with said end of the casing to limit the opening movement of the hook and to prevent separation of the hook from the casing.

3. In a clasp, a casing, a hook slidable in the casing and having its mouth closed by the casing in one position of the hook, and combined latch and stop means for the hook which in one position holds the hook with its mouth closed and in a second position limits the extent of opening movement of the hook and prevents separation of the hook from the casing.

4. In a clasp, a casing, a hook slidable in the casing and having its mouth closed by the casing in one position of the hook, means whereby to prevent separation of the hook from the casing, and means to latch the hook in closed position.

In testimony whereof I have signed my name to this specification in the presence of two subscribing witnesses.

RUFUS KING.

Witnesses:
GERTRUDE L. VOLLERT,
WILLIAM T. BENNETT.